United States Patent
Charlson et al.

[15] 3,700,333
[45] Oct. 24, 1972

[54] METHOD AND APPARATUS FOR MAKING AN IN-SITU DETERMINATION OF THE CHEMICAL PROPERTIES OF ATMOSPHERIC AEROSOLS

[72] Inventors: Robert J. Charlson; Norman C. Ahlquist, both of Seattle, Wash.

[73] Assignee: The Battelle Development Corporation, Columbus, Ohio

[22] Filed: Feb. 4, 1971

[21] Appl. No.: 112,630

Related U.S. Application Data

[63] Continuation-in-part of Ser. No. 854,214, Aug. 29, 1969, which is a continuation-in-part of Ser. No. 729,812, May 16, 1968, abandoned.

[52] U.S. Cl. ................356/103, 356/201, 250/218
[51] Int. Cl. ....G01n 21/00, G01n 21/06, G01n 21/26
[58] Field of Search......356/201, 204, 205, 207, 208, 356/36, 37, 72, 102–104; 250/218; 73/432 PS

[56] References Cited

UNITED STATES PATENTS

| | | |
|---|---|---|
| 2,684,008 | 7/1954 | Vonnegut..................356/37 |
| 2,716,371 | 8/1955 | Still..........................356/72 X |
| 2,938,423 | 5/1960 | Rich..........................356/37 |
| 3,010,308 | 11/1961 | Skala........................356/37 |
| 3,011,387 | 12/1961 | Johnson...................250/218 X |
| 3,037,421 | 6/1962 | Bigelow et al. ........250/218 X |
| 3,138,029 | 6/1964 | Rich..........................73/432 PS |
| 3,322,960 | 5/1967 | Geniesse.................356/103 X |
| 3,540,826 | 11/1970 | Bisberg....................356/102 |
| 3,592,546 | 7/1971 | Gussman..................356/37 |

OTHER PUBLICATIONS

Lee et al., Rev. Sci. Inst., V. 25, No. 10, Oct. 1954, pp. 1004– 1010.

*Primary Examiner*—Ronald L. Wilbert
*Assistant Examiner*—Conrad Clark
*Attorney*—Christensen & Sanborn

[57] ABSTRACT

An integrating nephelometer which provides an output signal proportional to the value of the extinction coefficient due to light scattering for a given sample of an atmospheric aerosol is described. A method for determining chemical and other properties of the aerosol sample using this nephelometer includes the steps of continuously varying some physical parameter of the aerosol sample while observing any change in the output signal provided by the nephelometer. In each case, a characteristic curve for the aerosol may be recorded over a range of values of the physical parameter, which curve identifies one or more properties of the aerosol, such as deliquescence, hygroscopicity, chemical composition, aerosol particle size distribution, and so forth. In one embodiment, the presence of deliquescent materials is ascertained by continuously varying the aerosol's relative humidity below a value of 100 percent while simultaneously recording the value of the nephelometer output signal and noting any discontinuities in the resultant recording. To obtain a clue as to the particular deliquescent material present in the aerosol, the relative humidity thereof is increased within a given range and the exact relative humidity at which a first discontinuity in the recording occurs is noted. To obtain an indication of the size distribution of the particles comprising the deliquescent aerosol, the relative humidity is further increased and the exact relative humidity at which a second discontinuity occurs is noted, and the slope of the characteristic curve between the first and second discontinuities thereof is calculated. By comparison of the aforementioned first discontinuity and slope with those of predetermined reference curves, information as to the particular deliquescent material and its size distribution may be obtained. The method is also applicable to hygroscopic materials and to other, broader, combinations of a reagent, physical parameter, and aerosol sample. Embodiments of apparatus for continuously varying the aerosol's relative humidity are also described.

14 Claims, 14 Drawing Figures

United States Patent
Charlson et al.

[15] 3,700,333
[45] Oct. 24, 1972

Patented Oct. 24, 1972

INVENTORS
ROBERT J. CHARLSON
NORMAN C. AHLQUIST

BY Christensen & Sanborn

ATTORNEYS

INVENTORS
ROBERT J. CHARLSON
NORMAN C. ALMQUIST
BY Christensen &
Sanborn
ATTORNEYS Patented Oct. 24, 1972

INVENTORS
ROBERT J. CHARLSON
NORMAN C. ALMQUIST
BY
Christensen & Sanborn
ATTORNEYS

INVENTORS
ROBERT J. CHARLSON
NORMAN C. ALMQUIST
BY
Christensen & Sanborn
ATTORNEYS

INVENTORS
ROBERT J. CHARLSON
NORMAN C. ALMQUIST

METHOD AND APPARATUS FOR MAKING AN IN-SITU DETERMINATION OF THE CHEMICAL PROPERTIES OF ATMOSPHERIC AEROSOLS

CROSS-REFERENCE TO RELATED APPLICATIONS.

This application is a continuation-in-part of a copending patent application "Integrating Nephelometer," Charlson et al., Ser. No. 854,214, filed Aug. 29, 1969, which is a continuation-in-part of "Integrating Nephelometer" Charlson et al., Ser. No. 729,812, filed May 16, 1968, and now abandoned.

FIELD OF THE INVENTION

This invention relates generally to a method and apparatus for making in-situ determinations of the chemical and other properties of an atmospheric aerosol, and more particularly, to such a method and apparatus for continuously varying some physical parameter of the aerosol sample while simultaneously measuring a parameter corresponding to the total light scattering thereof.

BACKGROUND OF THE INVENTION

The invention described herein was made in a course of, or under, a grant from the U.S. Public Health Service, Department of Health, Education and Welfare.

The spatial distribution, including the kind and quantity, of atmospheric pollutants in the vicinity of urban complexes or otherwise has been difficult to evaluate. These pollutants generally comprise an aerosol, which may be defined as a colloidal suspension of liquid or solid particles in the air. For horizontal and vertical profiling of the aerosol, large horizontal and vertical scales are normally required which include a plurality of static instruments and towers or mobile instruments. These currently available instruments lack desired versatility and sensitivity necessary for meaningful evaluation of the distribution.

The visual quality of air, including visual range and color, is related to air pollution by an atmospheric aerosol. Increases in atmospheric aerosol provides a degradation in visual quality which manifests itself in reduced visibility through the atmosphere. Thus, previous methods have involved readings by human observers of visual ranges by making a number of observations of a distant object through the atmosphere.

In order to have a more exact criterion of visual quality, the extinction coefficient due to light scattering may be measured. The light scattering coefficient is defined in "A New Instrument For Evaluating the Visual Quality of Air" by Ahlquist and Charlson, Journal of the Air Pollution Control Association, Volume 17, Number 7, July 1967. The light scattering coefficient may be determined by implementing the following attenuation equation:

$$I/I_0 = e^{-bx}$$

where:

$I_0$ = intensity of light prior to entering an atmospheric path.

$I$ = intensity of light after passage through an atmospheric path of distance $x$.

$b$ = extinction coefficient.

The quantity $b$, is made up of two components, $$b = b_{abs} + b_{scat}$$

where:

$b_{abs}$ = extinction coefficient due to absorption of light by particles or gases.

$b_{scat}$ = extinction coefficient due to scatter of light by particles or gases.

In general, it is possible to assume that $b = b_{scat}$ unless, of course, substantial quantities of light absorbing gases (e.g., $NO_2$) or particles (e.g., soot) are present. For most atmospheric aerosols, $b_{scat}$ is estimated to be about $10^2$ larger than $b_{abs}$. Integrating nephelometers have been built for measuring the scattering component of extinction coefficient, $b_{scat}$. Such devices optically integrate light scattered in all angles by the aerosol particles to obtain a value of $b_{scat}$ and are to be distinguished from devices which measure light scattering only at a discrete angle or angles. The term light scattering as used hereinafter is thus defined as that measured by taking the integral thereof over all scattering angles. The advantage of the nephelometer over other devices for measuring the visual quality of air is that the nephelometer takes a reading of the coefficient $b_{scat}$ at what may be considered a point in space and in time.

Since the integrating nephelometer may be designed to provide an output proportional to the extinction coefficient due to scatter $b_{scat}$, it is then a simple matter to relate this coefficient to spatial distribution of atmospheric aerosol by taking a plurality of readings at different points in space and time. It has been shown that the extinction coefficient due to light scattering can also be simply related to both visual range and to the mass of aerosol per volume of air by simple formulas.

The integrating nephelometer described in the aforementioned patent applications is particularly adapted for highly sensitive, accurate and correlatable monitoring of atmospheric aerosol. This device provides an electrical output signal which is proportional to the measured value of the extinction coefficient due to light scattering, or $b_{scat}$, for a given aerosol sample.

Because of its versatility and sensitivity, this integrating nephelometer is adaptable to obtaining information about atmospheric aerosols which was heretofore unrecognized or unmeasurable by simple instruments. At the very least, the integrating nephelometer should lend itself to classification of aerosols by measurement of the extinction coefficient due to light scattering. In addition, the nephelometer should be adaptable to instantaneous measurements on aerosol samples from which the present characteristics thereof that are related to air pollution, such as visual range and mass concentration, can be determined, and from which the future characteristics or effects of the aerosol upon the atmosphere can be predicted.

It is therefore an object of this invention to provide a method and an apparatus for investigation of the chemical and other properties of atmospheric aerosols, as those properties are related to the extinction coefficient due to light scattering thereof.

It is another object of this invention to provide a method and apparatus for obtaining qualitative chemical information about atmospheric aerosols, including their general type, composition, size distribution, and so forth.

It is a further object of this invention to provide a method and apparatus which aid in the prediction of future atmospheric conditions related to air pollution by atmospheric aerosols.

It is another object of this invention to sense in situ chemical reactions occurring in the condensed part of phase of an aerosol.

SUMMARY OF THE INVENTION

Briefly, this invention rests upon the discovery that atmospheric aerosols exhibit certain characteristic changes in the extinction coefficient due to light scattering when a physical parameter thereof is varied in the presence of a reagent, and in a method for continuously varying at least one physical parameter thereof while simultaneously measuring and observing the total light scattering thereof.

BRIEF DESCRIPTION OF THE DRAWINGS

The invention can perhaps best be understood by reference to the following portion of the specification taken in conjunction with the accompanying drawings in which.

DESCRIPTION OF A PREFERRED EMBODIMENT

Figure 1:
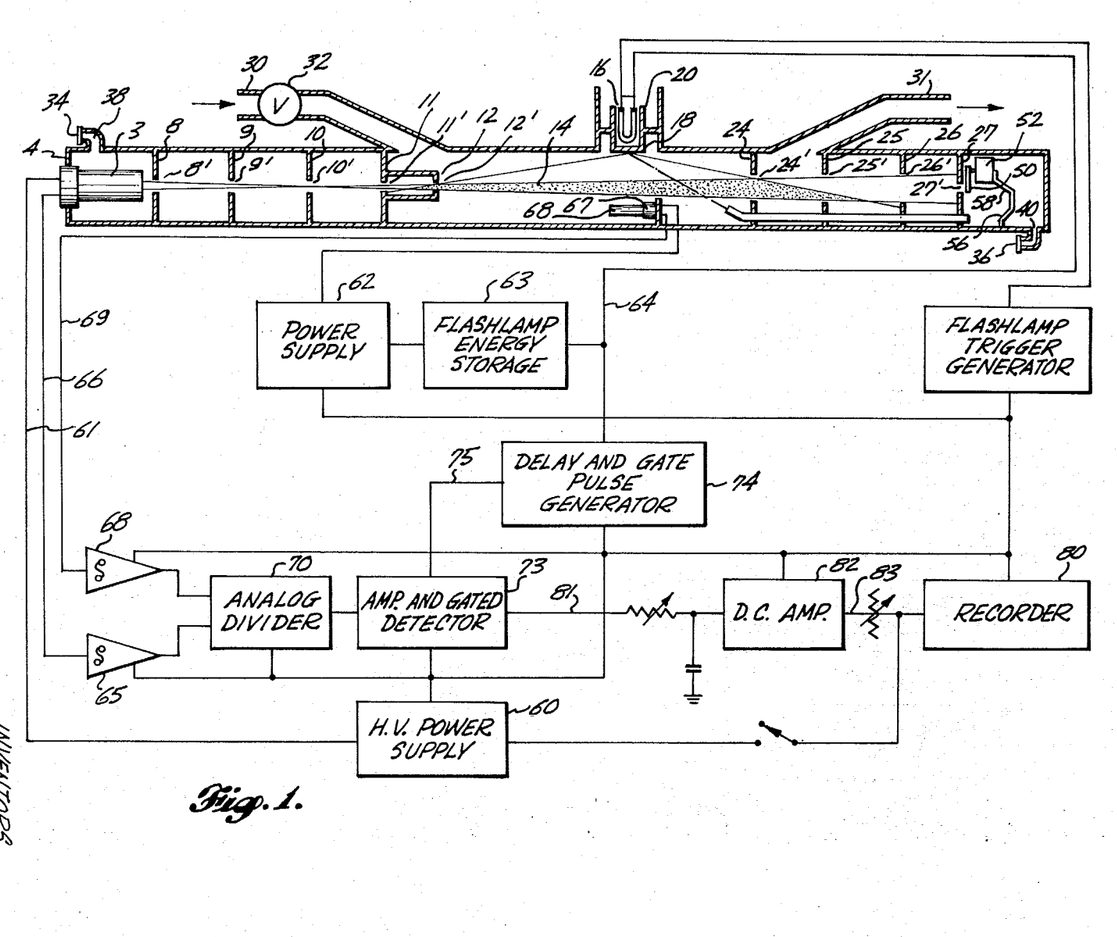
FIG. 1 is a schematic sectional view of an integrating nephelometer for use with the present invention, including a schematic diagram of its optical and electronic system.

The integrating nephelometer illustrated in FIG. 1 is primarily designed for the study of the spatial distribution of atmospheric aerosol. The instrument includes an optical system and an electrical system.

The optical system is disposed in a tubular container which may be of aluminum or other suitable material. In the preferred embodiment of the invention, the container 2 comprises a 130 cm length of 7.5 cm diameter thin wall aluminum tubing. A multiplier phototube 3, such as a 10 stage commercially available Amperex XP 1010 is mounted in the forward end 4 of the container 2.

A plurality of discs 8, 9, 10, 11 and 12 are disposed in the container 2 and are arranged to define a collimator and light trap. The discs 8, 9, 10, 11 and 12 define a series of apertures 8', 9', 10', 11' and 12' which are optically aligned with the phototube 3. A cone of observation 14 is defined by the disc 8 and the disc 11 and does not intersect the edges of apertures 9', 10' and 12'.

Discs 9, 10 and 12 serve as light traps and cast shadows on any surfaces seen by the phototube 3. The inside surfaces are preferably all coated with flat black paint to further reduce the effect of any reflected light.

The air sample is illuminated by a light source 16 and opal glass diffuser or window 18 disposed in a suitable housing 20 and located in the center section of the tubular container 2. The light source 16 may, for example, consist of a xenon flashlamp which produces a cosine emission characteristic by means of the opal glass diffuser 18. The diffuser 18 also forms a seal to the sample chamber. The fact that this geometry integrates over all scattering angles has been illustrated in the book *Vision Through The Atmosphere* by W. E. K. Middleton (1963).

A second series of discs 24, 25, 26 and 27 are disposed in the rear portion of the tubular container 2 and are separated from the discs 8, 19, 10, 11 and 12 by the central section of container 2. The disc 24 defines an aperture 24' which further defines the sample volume 14. Discs 25 and 26 serve as a light trap and define apertures 25' and 26'. The sizes of apertures 25' and 26' are determined by the amount of divergence in the observing beam of the phototube 3. The disc 27 is in the shadow of discs 24, 25, and 26 and is coated with flat black paint to further prevent direct reflection of light in the direction of the phototube 3.

An inlet duct 30 is provided for admitting air or other fluid to be sampled into the central sampling section and an outlet duct 31 is provided for discharging the sampled air after passing through the central section. Air flow through the system during the sampling operation is on a continuous basis. However, when calibrating the instrument, inlet duct 30 is closed as will be more fully explained hereinafter.

The nephelometer in FIG. 1 is provided with a recorder 80 which has a scale reading directly in values of the extinction coefficient due to light scattering $b_{scat}$. The primary standard for nephelometer calibration is the Rayleigh scattering of particle-free gases such as air, $CO_2$, and dichloro-difluoromethane ($CCl_2F_2$). Rayleigh scattering, as noted above, assumes that the extinction coefficient due to light scattering varies as the inverse fourth power of the light wavelength. Initial calibration of the nephelometer is made in the laboratory using controlled sources of the above-noted particle-free gases. Field calibration, however, presents another problem. Although particle-free air is readily reproducible under field conditions, $CCl_2F_2$ or $CO_2$ are not. Therefore, a secondary standard is provided in the instrument of FIG. 1.

The extinction coefficient $b_{scat}$ of air has a known, relatively small value, whereas the extinction coefficient $b_{scat}$ of $CCl_2F_2$, for example, has a known but relatively higher value. Thus, two points on the scale reading directly in the extinction coefficient $b_{scat}$ can be provided for field calibration if material or devices which provide $b_{scat}$ signals equal in magnitude to those of these gases can be obtained.

A valve 32 disposed in the inlet duct 30 shuts off the sample air stream. Glass fiber filters 34, 36 are disposed adjacent inlets 38 and 40 to provide a source of clean air purging the instrument of particle samples during a first calibration step and for keeping the phototube and light traps clean during operation. The inlets 38 and 40 are disposed one at each end of the container 2. The sample fluid and purging air are exhausted through duct 31. Air flow for purging the instrument is provided by movement thereof through the atmosphere or by means of a small air pump when the instrument is stationary. When valve 32 is closed, the continuous purge air flow fills the instrument with particle-free air. At this time, a first point on the $b_{scat}$ scale in recorder 80 may be checked in the field.

The disc 27 defines a 1 mm aperture 27' which is covered by a shutter 50. The shutter 50 is opened by means of a solenoid 52. For obtaining a second calibration point on the $b_{scat}$ scale, a light pipe 54 directs light onto a mirrored surface 56 to illuminate a white surface 58. The white surface 58 is viewed by the phototube 3 and the signal thus entered into the phototube is proportional to a $b_{scat}$ about equal to that of $CCl_2F_2$. This reading will usually appear about half-scale on the most sensitive range of the nephelometer and is readily obtained without the use of a primary gas. Thus, these two points—the clean air signal and a half-scale signal equivalent to particle-free $CCl_2F_2$—provide a rapid check of calibration in the field, usually in less than one minute.

The electronic system includes a high voltage power supply 60 having square wave converters and regulators to supply $-1,500$ to $-1,800$ volts to the phototube 3 through lead 61. The high voltage power supply 60 is well regulated and on log response is controlled by the analog signal to the recorder 80 to obtain a non-linear response when desired. The main power supply 62 contains a square wave converter to supply 450 volts to the flashlamp energy storage circuit 62. Resonant charging is employed to produce 800 volts across a 2 microfarad capacitor conducted to the flashlamp by lead 64. This charging method has high efficiency and results in a current requirement of only 0.9 amperes total at 12 volts DC for the entire instrument exclusive of the recorder. The flashlamp trigger generator 59 pulses the flashlamp 16 at any desired timed intervals.

The circuit, which is a two-beam system, compensates for the short-term noise and long-term drift in sensitivity caused by variations in intensity of the flashlamp 16. The output of the phototube 3 is a pulse of current about 20 microseconds long. The pulse of current is conducted to an integrator circuit 65 with a time constant of 250 microseconds by means of a lead 66. The integrator circuit 65 includes a range switch which varies the value of the integrating capacitor.

A reference phototube 67 is disposed in the central portion of the sample chamber 2 opposite the light source 16. A wratten number 47 blue filter 68 covers the tube to more closely match its spectral response to that of the combination of the multiplier phototube 3 and light scattering by air. Power (250 volts) is supplied from power supply 62 and the output of phototube 67 is conducted to an integrator circuit 68 by means of a lead 69. The outputs of integrator 65 and 68 drive an analog division circuit 70 which produces an output signal corresponding to the ratio of the signal pulse to the reference pulse. Thus, any fluctuations common to both phototube 67 and multiplier phototube 3, for example from flashlamp 16, are eliminated.

The ratio signal is delivered to an amplifier and gated detector 73. The amplifier circuit includes an electronic switch (not shown) which is closed from 50 to 150 microseconds after the start of a flash by means of a delay and gate pulse generator 74 which is connected to the amplifier and gated detector 73 by means of a lead 75. The resultant delay allows the flash to be completed ad the analog divider circuit 70 to stabilize. The resulting DC voltage output of the amplifier and gated detector 73 is coupled to a recorder 80 by means of a DC amplifier circuit 82 through leads 81 and 83. A DC bias is inserted in amplifier 82 to block out the background signal from light reflected by the walls of the nephelometer.

Air flow through the nephelometer is conveniently achieved by placing it either on the roof of an automobile or in an appropriate location on an aircraft, such as on the wing. The externally mounted glass fiber filters 34 and 36 provide clean purge air from the same motion. For static operation, a small axial-flow fan can be mounted on the exhaust 31. No adjustments to the optical unit are necessary during a measurment so that data might be taken continuously from inside a vehicle. Calibration checks may be made whenever desired. However, the stability of the zero and gain of the instrument is such that at most one or two field calibrations suffice per hour of operation. The absolute accuracy of the instrument for measuring the extinction coefficient due to scattering is probably of approximate magnitude $\pm 10$ percent, depending on the accuracy of the calculated value of the Rayleigh extinction coefficient for particle-free air and other primary calibration sources. The signal-to-noise ratio at an extinction coefficient $b_{scat}$ of $5 \times 10^{-4} m^{-1}$ is more than 25 with a 2-second time constant and is 20 with a ½ second time constant. A 1-second time constant corresponds to about 30 meters (100 feet) at a speed of 100 km/hour (60 mph).

Although the nephelometer of FIG. 1 gives speedy and accurate readings of the extinction coefficient $b_{scat}$ to thereby objectively determine the spatial distribution of atmospheric aerosol, the readings thus obtained have only been correlated with other, more traditional parameters of visual quality, such as visual or meteorological range, or mass concentration of the aerosol particles by application of an assumed wavelength of peak sensitivity of the nephelometer. It is known that visual range can be related to the scattering coefficient $b_{scat}$ at the wavelength of peak sensitivity by a simple formula, that is, $Lv = K_1/b_{scat}$, where $L_v =$ visual range and $K_1$ is a constant.

Likewise, a relation has been proposed between mass concentration of aerosol and the scattering coefficient $b_{scat}$, that is, MASS $= K_2 (b_{scat})$, where MASS = mass concentration in grams per cubic meter and $K_2$ is a constant. As described in the aforementioned copending patent application, the constants $K_1$ and $K_2$ have been accurately determined, by demonstrating that the effective wavelength or peak sensitivity of the integrating nephelometer of FIG. 1 does not vary significantly with changes in the type of aerosol. Moreover, secondary scales corresponding to the visual range $L_v$ and mass concentration can be placed on the instrument. These quantities can now be related to the scattering coefficient at the effective wavelength of the integrating nephelometer by means of calculated relations $L_v = 4.7/b_{scat\ 500\ nm}$ and MASS $= 3.8 \times 10^5 (b_{scat\ 500\ nm})$.

For most atmospheric studies, the determination of $L_v$ and MASS is sufficient. However, the sensitivity of the integrating nephelometer of FIG. 1 makes it ideally adaptable to more sophisticated determinations of the properties of atmospheric aerosols which heretofore have been unrealized. For example, a very important phenomenon of air pollution is that increase in light scattering, and thus decrease in visual quality, occurs when the relative humidity of the air increases, under certain conditions. It has been proposed that the reason for this phenomenon is due to deliquescence, which may be defined as the formation of a solution when a solid salt is exposed to liquid vapor at a partial pressure greater than that of the saturated solution of its highest hydrate. Particularly in terms of an atmospheric aerosol, deliquescence occurs when colloidially suspended salt particles form solution droplets at a definite relative humidity. Because of the change in physical properties from particles to droplets, light scattering increases rather sharply and this increase can be measured in terms of the extinction coefficient $b_{scat}$. However, this phenomenon has not been readily susceptible of accurate determination because of a lack of suitable instrumentation for measuring the effects of deliquescence while precisely controlling the relative humdity within a small or point sample of the atmospheric aerosol. In other words, it has not previously been possible to make an in situ determination of the variation in $b_{scat}$ with respect to humidity changes in deliquescent aerosols.

The integrating nephelometer of this invention has sufficient sensitivity, range and stability so that it can be used for the study of this penomenon. Now referring to the structure of FIG. 2, an integrating nephelometer is generically designated by the number 200 and is otherwise identical with the instrument illustrated in FIG. 1. The modifications consist essentially in the addition of a humidifier to the aerosol inlet and a humidity monitoring device 202 to the aerosol outlet. The device 201 comprises a water flow regulator 203 whose stream is conveyed to a porous lining 204 inside an aluminum tube 205 adjacent the aerosol inlet. Wrapped about the tube 205 is an electric heating tape 206 which is connected to and supplied from a temperature regulating network 207. The humidity measuring device 202 may comprise a psychrometer 210 mounted in the aerosol outlet. A fan 211 is also mounted in that outlet to insure sufficient flow rate of the aerosol sample.

Figure 2:
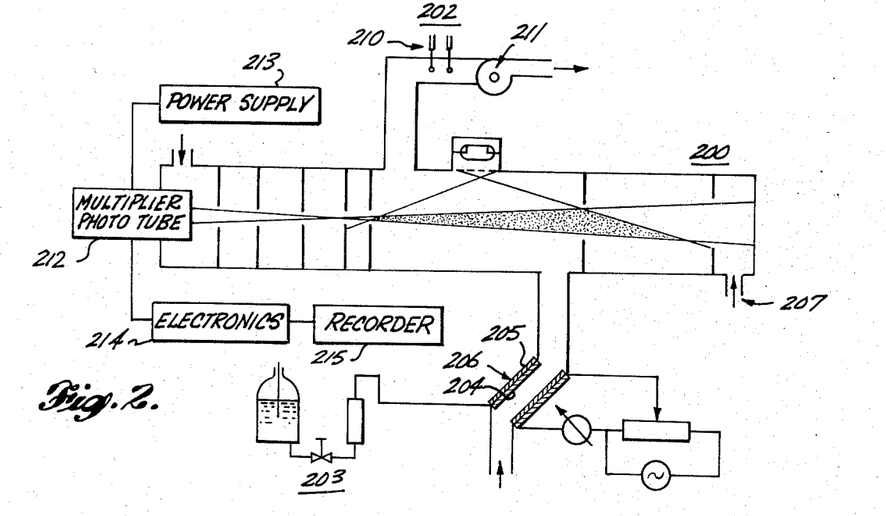
FIG. 2 is a schematic sectional view of an integrating nephelometer for use with the present invention, in combination with an apparatus for varying the humidity of the aerosol sample within.

Humidity of the sample is varied by adding known amounts of water vapor to the air stream. The water is gravity fed from the water flow regulator 203 to the porous lining 204. A large wet area is thus exposed to the air stream, and the vaporization of the water may be enhanced by raising the temperature of the aluminum tube 205 by means of the heating tape 206.

The values of $b_{scat}$ thus obtainable with varying relative humidities of the air sample may be measured in a manner identical to that of FIG. 1. To this end, the nephelometer of FIG. 2 includes a multiplier phototube 212, a power supply 213, an electronic system 214 having also as input the reference signal from a reference phototube not illustrated, and a recorder 215.

If desired, the humidity measuring device 202 could comprise an automated dew-point hygrometer, and solid state electronic circuitry could be provided in which the readings thereof could be converted to relative humidity along with the corresponding value of $b_{scat}$.

Figure 3:
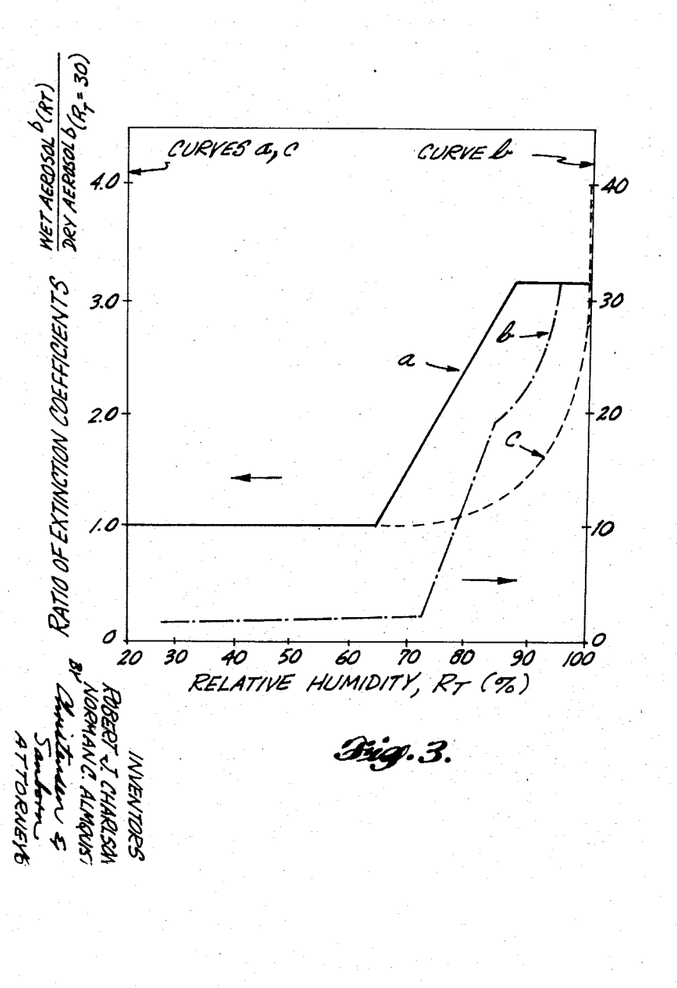
FIG. 3 is a chart showing the variation in extinction coefficient due to light scattering with relative humidity in deliquescent and other aerosols.

The results of one experiment using the integrating nephelometer of FIG. 2 are shown by the chart of FIG. 3. The ordinate of this chart represents the ratio of the extinction coefficient $b_{scat}$ at a variable relative humidity to the extinction coefficient $b_{scat}$ at a relative humidity of 30 percent. Curve $a$ represents the readings obtained from a maritime aerosol, curve $b$ the readings obtained from a laboratory-produced NaCl salt aerosol and curve $c$ represents the readings obtained from a typical urban aerosol.

As can be noted, both the maritime and the laboratory aerosol exhibit a rapid change in $b_{scat}$ at a fairly definite relative humidity. Therefore, both these aerosols are expected to contain a large portion of deliquescent materials. However, the urban aerosol does not exhibit such behavior, but rather exhibits a drastic increase in the extinction coefficient only at extremely high relative humidities. Although this data is preliminary, it does indicate that perhaps deliquescent salts do not form a significant portion of urban pollution. At the very least, the use of the integrating nephelometer in this manner can presently be used to predict the presence or absence of deliquescent materials in significant proportions in the atmosphere.

It can also be seen that the curves in FIG. 3 may each have a characteristic which is peculiar to a particular property or properties of the aerosol sample. In order to obtain more precise and accurate recordings of any relation between the extinction coefficient due to light scattering and some physical parameter of the aerosol, such as relative humidity, the improved apparatus shown in FIG. 4 may be constructed. This apparatus is similar to that illustrated in FIG. 2, with the exception that the relative humidity of the aerosol sample can be continuously and precisely varied within a predetermined range of values less than 100 percent.

Figure 4:
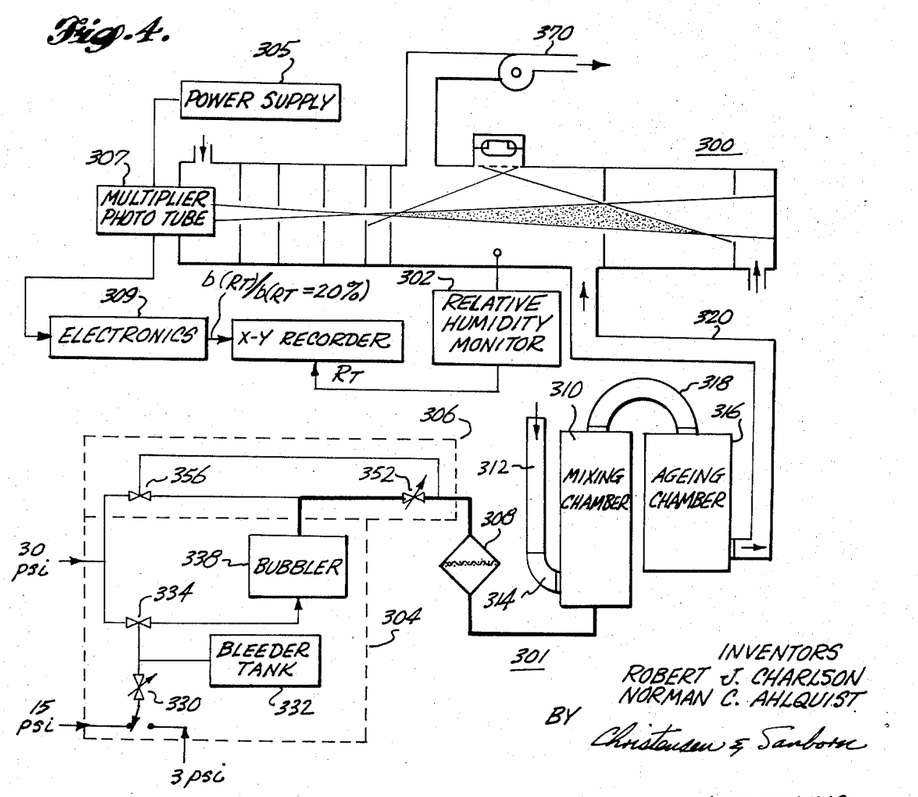
FIG. 4 is a schematic sectional view of an integrating nephelometer for use with the present invention, in combination with an apparatus for continuously varying the relative humidity of the aerosol sample.

Now turning to FIG. 4, an integrating nephelometer is generically designated by the numeral 300 and is otherwise identical with the instrument illustrated in FIG. 1. The modifications consist essentially in the addition of a constant and continuous flow humidifier 301 to the aerosol inlet, a relative humidity monitor 302 into the sample volume of the nephelometer, and an X-Y recorder 303. The humidifier 301 provides a continuous, constant flow of aerosol to the inlet of the nephelometer whose water vapor content is varied automatically within a given range of relative humidity, such as 20 to 100 percent. To this end, humidifier 301 includes a source 304 providing a continuously variable flow of moist air having a relative humidity of 100 percent, at a predetermined temperature, and a flow regulating device 306 which adds to the moist air from source 304 a flow of dry air, such that the combined output thereof is a constant flow of air, at a predetermined temperature, whose moisture content is variable. The output flow from flow regulating device 306 is passed through a filter 308 and supplied to a mixing chamber 310.

The aerosol sample is conducted by a tube 312 to a preheating device 314 and thence also introduced into mixing chamber 310. The flow rates and geometrical configuration within mixing chamber 310 insure turbulent flow conditions such that complete mixing between the aerosol sample and the flow of variable relative humidity air is achieved. From mixing chamber 310, the controlled humidity aerosol sample is then conducted to an aging chamber 316. The dimensions of aging chamber 316 are chosen so that the aerosol sample has a certain predetermined residence time therein to allow equilibrium conditions to be attained. From aging chamber 316, the aerosol sample is applied to the aerosol inlet of the integrating nephelometer 300 by a tube 320.

Figure 6:
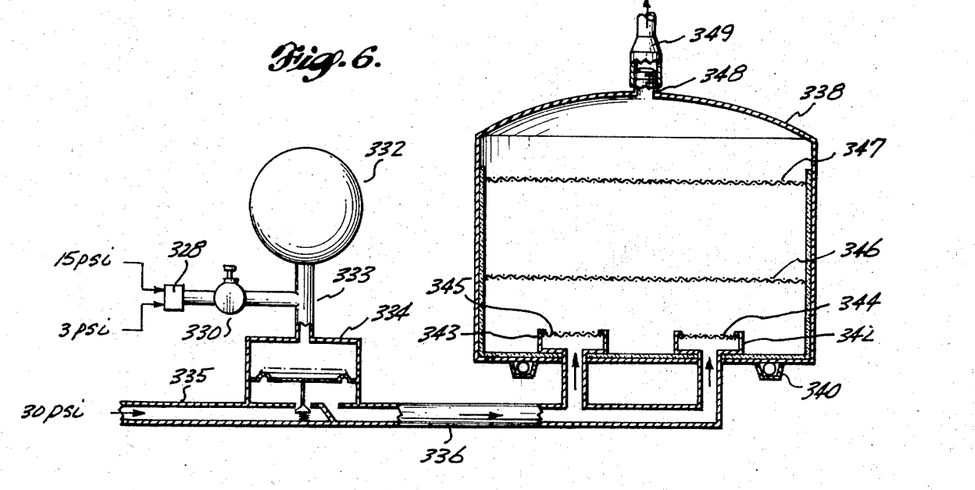
FIGS. 6, 7 and 8 are schematic sectional views, respectively, of various elements of the apparatus illustrated in FIG. 4.

An embodiment of the source 304 is shown in more detail in FIG. 6. A pneumatic switch 328 couples either a 15 psi or 3 psi source of air pressure to one side of a needle valve 330 whose other side is connected via a conduit 333 to a bleeder air tank 332 and the control side of a flow regulating device 334. A 30 psi source is coupled by a conduit 335 to the input of device 334 and the output thereof is connected via a conduit 336 to a water bubbler 338. A variable flow of air in conduit 336 is derived from the 30 psi source in the following manner. Assuming that the pneumatic switch 328 has been actuated so as to connect the 3 psi source to the input side of needle valve 330 for a relatively long period of time, the pressure in air tank 332 is approximately equal to 3 psi. If pneumatic switch 328 is then actuated to connect the 15 psi source to one side of the needle valve 330, the pressure in air tank 332 gradually rises so as to increase the pressure on the control side of regulator device 334. The resultant action of the regulator device 334 gradually increases the flow rate of air in conduit 336.

The bubbler 338 may comprise a metallic vessel which contains a quantity of water heated by a heating element 340 in the base thereof. The temperature of the water is regulated at a predetermined temperature by means not illustrated. In one embodiment, this temperature comprised 80° C.

The variable flow of dry air in conduit 336 is introduced into bubbler 338 through two access openings terminating in open faced filter holders 342, 343, and sintered steel filters 344 and 345 supported thereby. The bubbler 338 includes first and second baffles 346, 347, which aid in dispersion of the air from conduit 336 and in the resultant humidification thereof. An outlet 348 at the top of bubbler 338 allows the now moist, variable flow of air to escape therefrom. A conduit 349 conducts this flow to the flow regulation stage 306. Conduit 349, as well as the succeeding portions of the system extending to the inlet of mixing chamber 310, are heated to maintain the temperature of the air therein constant.

Figure 7:
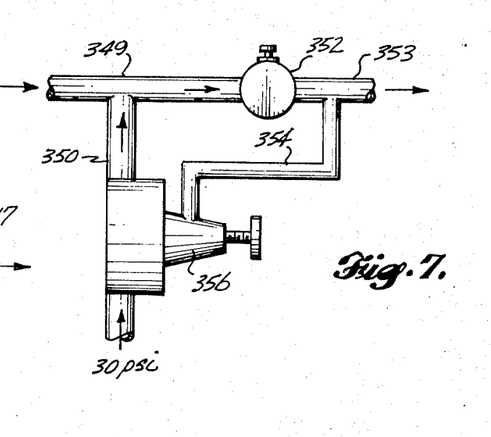

Now referring to FIG. 7, the variable flow of moist air in conduit 349 is added to a variable flow of dry air obtained from a conduit 350. The combined flow in conduit 349 is then applied through an adjustable valve 352 to a conduit 353. A portion of the flow in conduit 353 is conducted by a conduit 354 to the control side of a second flow regulation device 356. The input of device 356 is coupled to a 30 psi source and the output thereof is connected to conduit 350. Pressure regulation device 356 is manually adjustable, but produces a constant flow by maintaining the pressure drop across valve 352 constant at all times. For example, when the flow rate of the moist air in conduit 349 decreases, the regulator 356 allows more air from the 30 psi source to pass to conduit 350, thereby increasing its flow rate to compensate exactly for the decrease in flow rate in conduit 349.

Therefore, the air flowing in conduit 353 has a temperature approximately equal to that of the bubbler 338, such as 80° C, a moisture content which varies within a certain range, and a flow rate which is always constant.

This air is again filtered in a second filter 308 and supplied to the mixing chamber 310. Specifically, conduit 353 is brought through a first end of chamber 310 and terminates in a metallic disc 360 having a central aperture therein. The end of mixing chamber 310 into which conduit 353 is introduced is sealed by a plug 362, preferably of insulating material. To eliminate condensation of both the aerosol sample and the variable humidity air flow, the portions of conduit 353 within mixing chamber 310 are wrapped with electrical heating wire and surrounded by an insulating tube 364.

Figure 8:
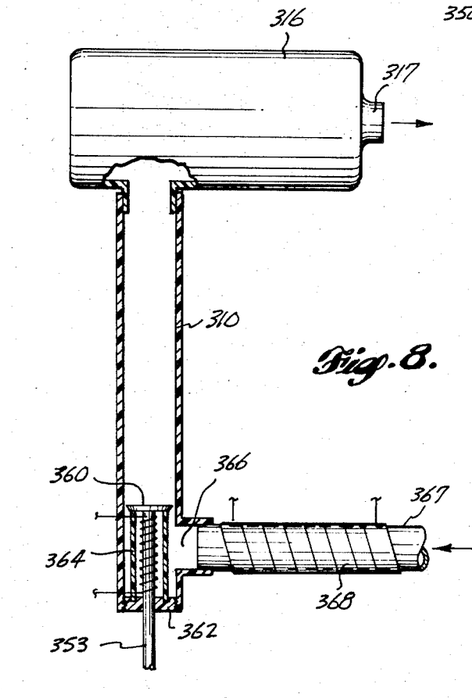

The aerosol sample is introduced into the mixing chamber through an inlet 366 located adjacent insulating tube 364. In the embodiment of FIG. 8, the heating chamber 312 may comprise a length of aluminum tubing 367 which is wrapped with a heating tape 368.

The remainder of mixing chamber 310 comprises an elongated cylinder of plastic material. The flow rate of the aerosol sample introduced through tube 367 and the flow rate of the air introduced through tube 353, together with the geometry of the mixing chamber defined by the interior elements thereof and the shape of the cylinder, insure that turbulent flow conditions exist so that complete mixing is effected to the two flow streams.

The upper end of chamber 310 is connected to the inlet of the aging chamber 316. In the embodiment of FIG. 8, this chamber 316 comprises a polypropylene bottle. In one case, the residence time of the sample within chamber 316 was approximately 1 second. The portions of the sample leaving chamber 316 through its exit 317 comprise an equilibrium mixture of the aerosol and water vapor whose relative humidity has a certain predetermined value. In turn, outlet 317 is connected to conduit 320 so that the aerosol sample is conducted to the inlet of the integrating nephelometer 300.

The temperature imparted to the aerosol sample by the heating tape 368 is such that the relative humidity thereof entering mixing chamber 310 is less than a predetermined minimum value. In one embodiment, this value may be on the order of 20 percent relative humidity. The relative humidity of the moist air in conduit 353 which enters mixing chamber 310 is gradually increased within a range of about 70 to 100 percent. Because of the mixing action taking place in chamber 310, and because of the equilibrium conditions obtained in aging chamber 316, the relative humidity of the aerosol sample present at outlet 317 has a minimum value equal to the minimum relative humidity of the aerosol in tube 312, such as 20 percent. The relative humidity thereafter gradually rises to a maximum of approximately 90 percent.

In operation, the aerosol at the inlet of the nephelometer 300 is continuously drawn through the sampling volume by a fan 370 disposed in the aerosol outlet thereof. Since the scanning rate of the integrating nephelometer is high relative to the time period required for the relative humidity of the aerosol sample to be raised from its minimum to its maximum values, a plurality of successive determinations of the extinction coefficient due to light scattering are made thereby which are applied as a continuous output signal from the electronics 309 of the nephelometer to one input of the X-Y recorder 303. At the same time, the relative humidity monitor 302 is continuously sensing the humidity of the aerosol sample within the sampling volume and providing an output signal proportional thereto the other input of X-Y recorder 303. As a result, a curve is traced by the recorder 303 which plots the instantaneous value of the extinction coefficient due to light scattering for the aerosol sample against the instantaneous value of the relative humidity thereof.

When the measurement interval is over, the pneumatic switch 328 may be actuated to its original position to connect the 3 psi source to one side of needle value 330. At this time, the air within tank 332 slowly bleeds back through needle valve 330 to the 3 psi source so that regulator 334 gradually reduces the flow rate of air in conduit 336, and thus, the relative humidity of the aerosol sample presented to the nephelometer 300. During this period, the X-Y recorder may be left connected to the nephelometer and the relative humidity monitor 302 to provide a check of the curve obtained when the relative humidity of the aerosol sample was first increased. When the pressure in tank 332 has bled down to a value equalling 3 psi, switch 328 may be again actuated to connect the 15 psi source to needle valve 330 and repeat the measurement interval.

Figure 5:
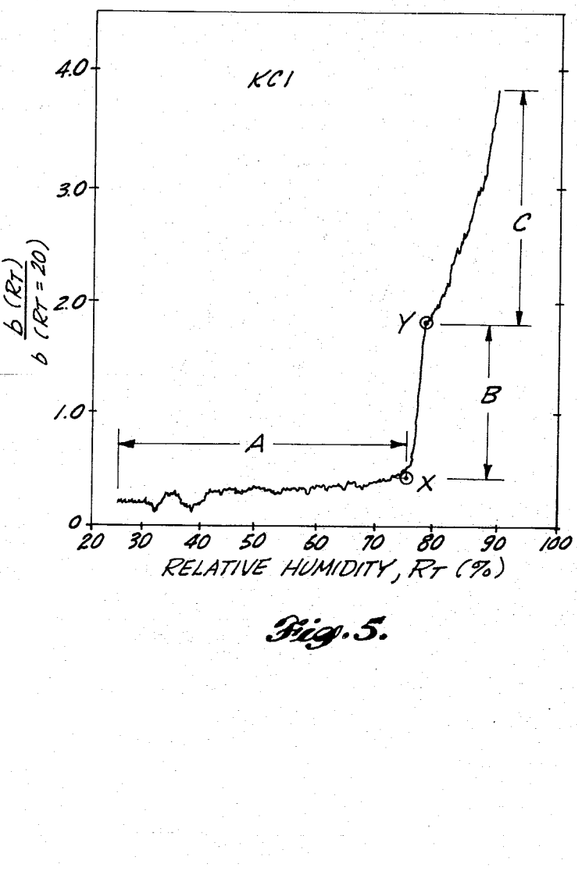
FIG. 5 is a chart showing the variation in the extinction coefficient due to light scattering with relative humidity in a deliquescent aerosol, using the apparatus of FIG. 4.

The results of one experiment using the apparatus of FIG. 4 is shown by the chart of FIG. 5. As with FIG. 3, the ordinate of this chart is normalized to represent the ratio of the extinction coefficient $b_{scat}$ at a variable relative humidity to the extinction coefficient $b_{scat}$ at a relative humidity of 26 percent. The curve in FIG. 5 represents the reading of the extinction coefficient $b_{scat}$ obtained for a 5 percent solution of potassium chloride (KCL), which aerosol was produced under laboratory-controlled conditions and coupled through tube 312 to humidifier 301.

The curve in FIG. 5 can be subdivided into three regions, A, B, and C. Region A begins at the lower limit of the relative humidity range, or approximately 20 percent relative humidity, and terminates at a first discontinuity X. Region B begins at the first discontinuity X and terminates at a second discontinuity Y. Region C begins at the second discontinuity Y and terminates at the upper limit of the relative humidity range, or approximately 90 percent relative humidity.

By thus subdividing the curve, the chemical process by which the potassium chloride salt is converted into an equilibrium solution can be analyzed. In region A, it can be noted that the extinction coefficient $b_{scat}$ rises gradually throughout with increases in relative humidity. This type of light scattering increase can be attributed to adsorption of water vapor by the salt particles. The second region, B, clearly shows the characteristic curve to be expected of all deliquescent materials, that is, a sharply rising value of the extinction coefficient $b_{scat}$ with small changes in the relative humidity. At point X, the aerosol comprises primarily solid particles. At point Y, the salt has chemically reacted with the water vapor to form an aerosol of primarily liquid particles. In region C, the rate of increase of light scattering is again greater than that experienced in region A, but less than that experienced in region B. In this region, the liquid droplets form larger and larger liquid droplets due to the effects of solution-vapor equilibrium.

It has been ascertained that the specific relative humidity X is related to the size of the colloidally suspended salt particles. It has been further ascertained that the relative humidity Y is determined by the largest of the colloidally suspended salt particles. If the compound is absolutely pure and mono dispersed, the relative humidities at X and Y are equal. In either case, the relative humidity at the point Y is indicative of the nature of the chemical composition. As shown in more detail hereinafter, the relative humidity at this discontinuity for potassium chloride is different than that for sodium chloride.

If the composition of the aerosol is not pure, the relative humidity X still gives a clue as to the chemical composition of the salt having the smallest particles, and the relative humidity Y gives a clue as to the chemical composition of the salt having the largest particles. In addition, the slope of the curve in region B is in turn related to the size distribution of the aerosol particles.

In the absence of deliquescent materials in the aerosol, first and second discontinuities of the type present at X and Y cannot be present in the extinction coefficient-relative humidity curve. Reference should be made back to FIG. 3 for a comparison of the shapes of curves A and C, which represent aerosols comprising deliquescent and non-deliquescent materials, respectively. It can be seen that a hygroscopic material such as in curve C of FIG. 3 exhibits the characteristics of regions A and C of FIG. 5, in which the salt particles first absorb water at a gradual rate, then, as they become larger, become more dilute solution droplets.

Therefore, the shape of the curve indicates whether deliquescent or non-deliquescent materials are present. In the case of deliquescent materials, a clue as to the exact chemical composition and size distribution of the particles in the aerosol can be also obtained.

In the case of deliquescent and hygroscopic materials, the rapid or relatively rapid increase in light scattering at a definite relative humidity or range of humidities can be used to predict a corresponding increase in visibility degradation. For example, it is possible to continuously monitor the atmospheric aerosol in an urban area. If a characteristic curve such as that encountered in FIG. 5 is obtained, a very accurate prediction could be provided of when visibility might suddenly decrease in a manner akin to fog, knowing the expected temperature changes and present relative humidity.

The integrating nephelometer can also be used in a similar manner to provide insight into the particular chemical compounds present in an aerosol, by introducing a reagent other than water vapor into the nephelometer chamber, under controlled conditions. Thus, a change in the extinction coefficient $b_{scat}$ can be used to ascertain the presence of organic aerosols if $CCl_4$ vapor were used as a reagent, or the presence of some reactive basic compounds if HCL were used, and the presence of some acids if $NH_3$ were used.

The results of additional experiments using the apparatus of FIG. 4 are shown by the charts in FIG. 9-14. In a manner similar to that of FIGS. 3 and 5, the ordinates of these charts are normalized to represent the ratio of the extinction coefficient $b_{scat}$ at a variable relative humidity, to the extinction coefficient $b_{scat}$ at a relative humidity of 20 percent.

Figure 9:
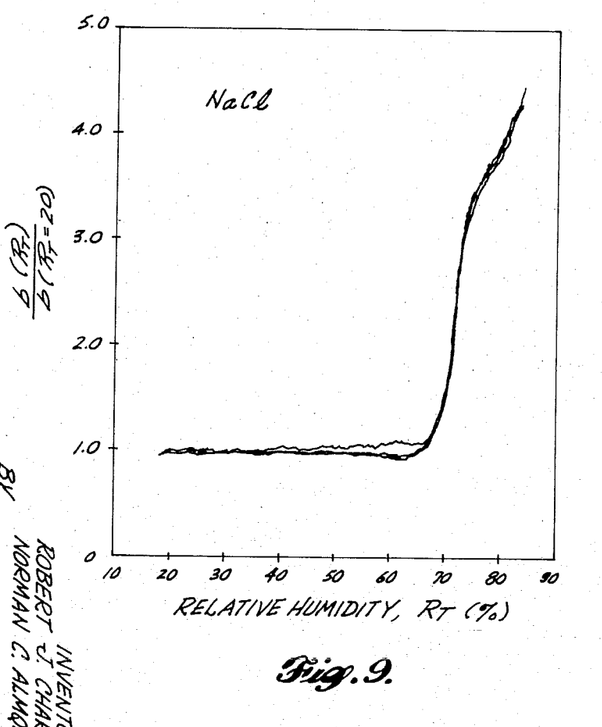
FIGS. 9–14 are charts showing the variation in the extinction coefficient due to light scattering with various other aerosols.

The curves in FIG. 9 represent three readings of the extinction coefficient $b_{scat}$ obtained for a 5 percent solution of sodium chloride (NaCl), which aerosol was produced under laboratory-controlled conditions and coupled through tube 312 to humidifier 301. The three regions A, B and C seen in the curve of FIG. 5 are also noted in each of the curves in FIG. 9. In region A, the extinction coefficient $b_{scat}$ is relatively constant, with the exception of curve 1. Thus, a first characteristic of the salt is identified. That is, the salt NaCl does not absorb water vapor to any significant extent within the range of relative humidities preceding deliquescence in region A. This characteristic is different from that of the potassium chloride salt seen in FIG. 5, in which a gradual rise in the extinction coefficient $b_{scat}$ is noted.

The region B again clearly shows the characteristic to be expected of all deliquescent materials, that is, a sharply rising value of the extinction coefficient $b_{scat}$ with small changes in the relative humidity. In the third region, C, the value of the extinction coefficient $b_{scat}$ again rises due to growth of the liquid droplets of the aerosol.

Another important fact to be noted from a comparison of the curves in FIGS. 5 and 9 is the difference in the relative humidity values at which the first and second discontinuities occur. For potassium chloride, these discontinuities occur at 75 percent and 78 percent, respectively, whereas for sodium chloride, these discontinuities occur at about 67 percent and 73 percent, respectively, of relative humidity. Laboratory measurements of this type show that the particular values of relative humidity at which these discontinuities occur are truly indicative of the particular deliquescent material present. Further, the laboratory-obtained values thereof may be used as a clue to the chemical constituents of a naturally occurring aerosol, such as would be found in maritime or urban areas.

For example, the fact that the values of these discontinuities are relatively constant is evidenced by the three curves in FIG. 9, which were made for three successive samplings of a laboratory-produced aerosol. Curve 1 exhibits some hygroscopic effects in the first region A, possibly due to the presence of impurities within the nephelometer's sampling chamber during measurement.

Figure 10:
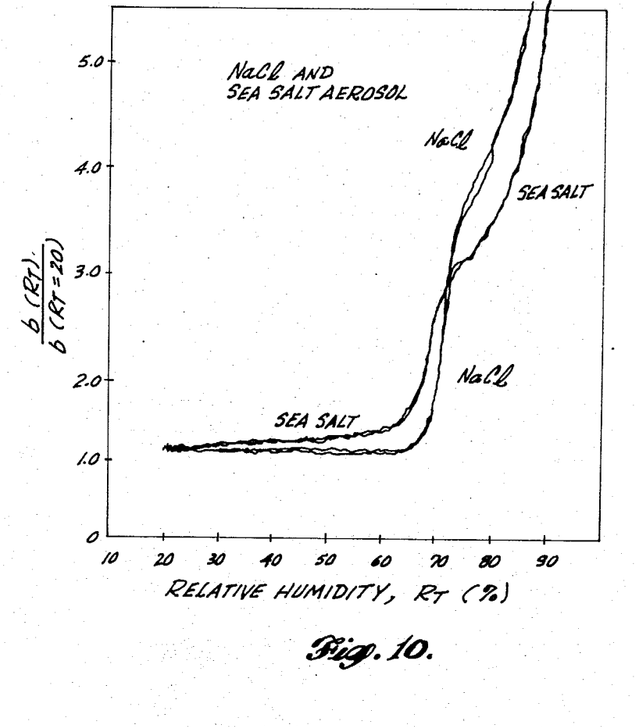

As a further example, FIG. 10 illustrates a comparison of the characteristic curves obtained from a laboratory-produced sodium chloride aerosol and a naturally occurring maritime aerosol. There are two duplicate traces provided for each curve.

A comparison of the NaCl curves in FIGS. 9 and 10 shows that the first and second discontinuities thereof occur at roughly the same relative humidity values. In FIG. 10, the first discontinuity occurs at about 66 percent relative humidity, whereas the second discontinuity occurs at about 73 percent relative humidity.

Although the maritime and sodium chloride curves have many apparent differences, the similarities are significant. First, the maritime aerosol curve exhibits the first, second and third regions to be expected from a deliquescent material. Second, the first discontinuity in the maritime aerosol curve occurs at roughly 65 percent relative humidity, whereas the second discontinuity thereof occurs at roughly 75 percent relative humidity. Therefore, the maritime aerosol contains a high percentage of sodium chloride particles. The gradual increase in the extinction coefficient $b_{scat}$ in the first region of the maritime aerosol curve can be attributed to another hygroscopic material.

By using this invention, therefore, a clue can be obtained as to the chemical composition of a naturally occurring aerosol. In addition, this clue is obtained by making in-situ measurements of the aerosol. That is, a sample of the aerosol may be taken at a given location and a characteristic curve immediately obtained. If an apparatus similar to that of FIG. 4 is used, the trace recording is made in less than 1 or 2 minutes. Moreover, because of the real-time nature of this measurement, the chemical composition of naturally occurring aerosols may be profiled in much the same manner as is spatial distribution of aerosols, including the mass distribution and visual range previously mentioned.

Figure 11:
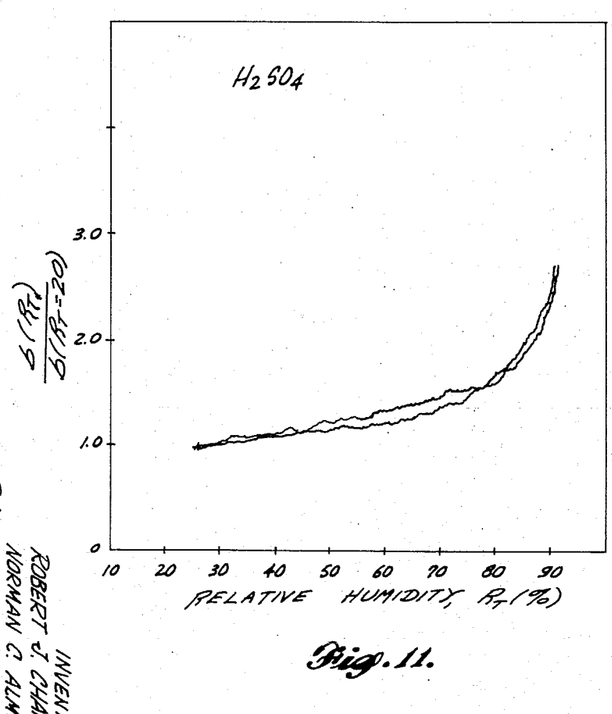

FIG. 11 represents a reading of the extinction coefficient $b_{scat}$ obtained for a 5 percent solution of sulphuric acid ($H_2SO_4$), which aerosol was produced under laboratory-controlled conditions as previously. Again, the curve includes two traces taken for increases in relative humidity in successive aerosol samples. The sulphuric acid aerosol exhibits properties which are truly hygroscopic, that is, the extinction coefficient gradually rises through the range of relative humidity variation.

Figure 12:
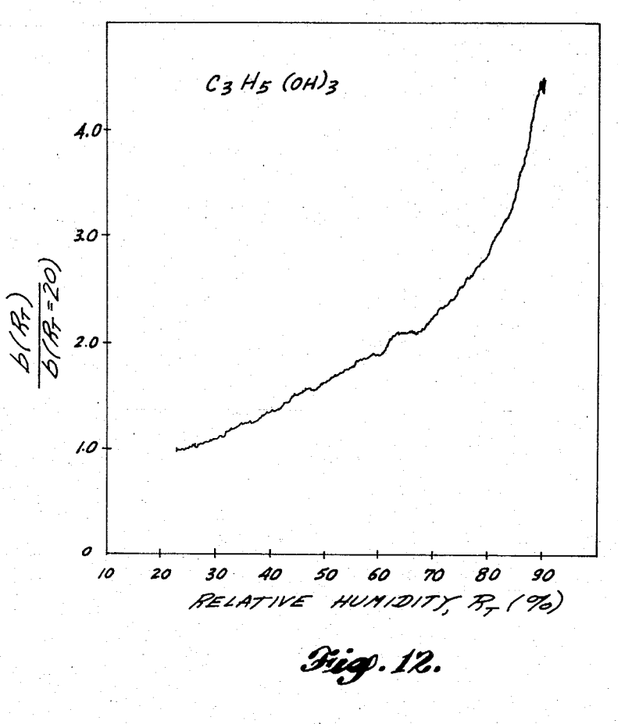

The curve in FIG. 12 illustrates a single trace of the extinction coefficient $b_{scat}$ obtained for glycerol [$C_3H_5(OH)_3$], again produced under laboratory-controlled conditions. As with sulphuric acid, glycerol exhibits hygroscopic properties. The curves in FIGS. 11 and 12, although representative of hygroscopic materials, exhibit significant differences. First, the curves have different slopes. Second, the value of the normalized extinction coefficient at 80 percent relative humidity is about 1.75 for the sulphuric acid aerosol, and about 2.75 for the glycerol aerosol. The curve obtained for each hygroscopic material is characteristic of that material and may be used as a clue to identify the presence of that material in a naturally occurring aerosol.

Figure 13:
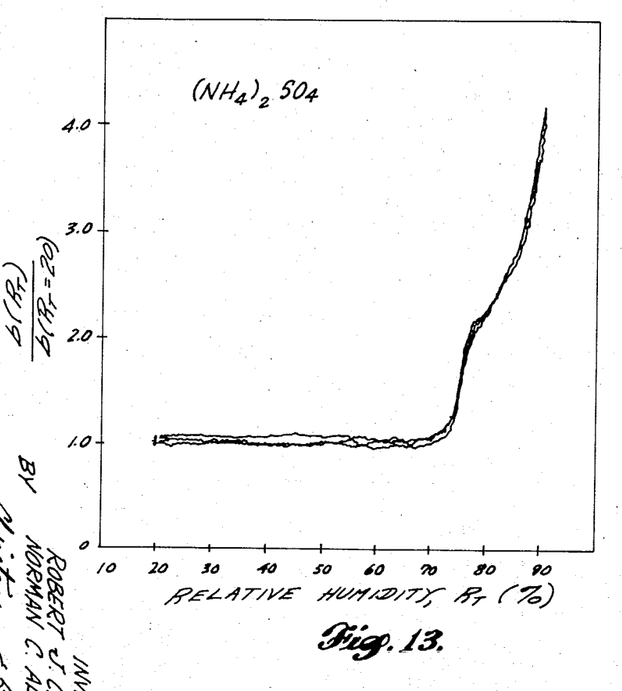
Figure 14:
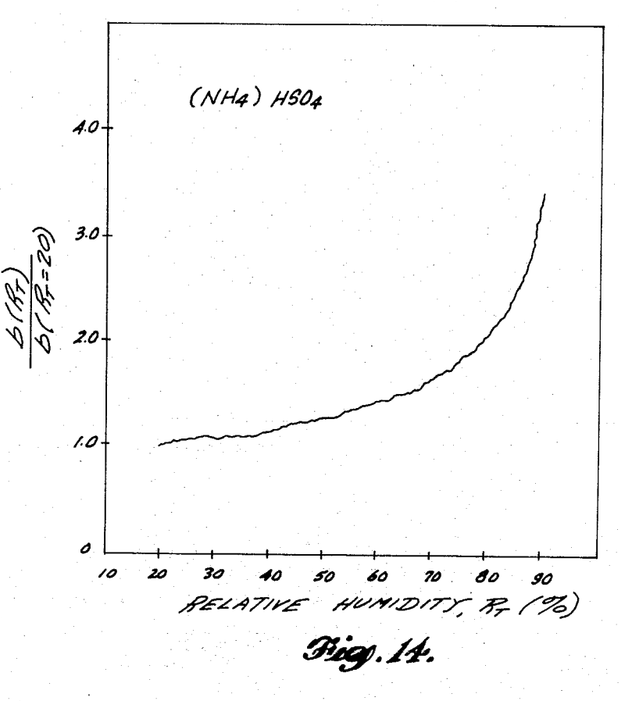

FIGS. 13 and 14 illustrate characteristic curves obtained from measurements of laboratory-produced aerosols of two ammonium compounds. The curve in FIG. 13 for ammonium sulfate [$(NH_4)_2SO_4$], illustrates the deliquescent nature of that material, with first and second discontinuities of 72 percent and 78 percent, respectively, of relative humidity. However, the curve in FIG. 14, for ammonium hydrogen sulfate [$(NH_4)HSO_4$], shows that compound to be hygroscopic.

Since laboratory-produced aerosols have correlatable and readily identifiable characteristic curves, it follows that naturally occurring aerosols also have unique characteristics. The method thus has applicability in tracing of pollutants. For example, a characteristic curve is obtained for an air sample taken in an area where an unknown pollutant is causing damage. Characteristic curves are also obtained for suspected effluent sources. A subsequent comparison of the characteristic curves then aids in the isolation of the particular effluent source causing this damage.

While the application has been described with reference to a preferred embodiment and several illustrative examples thereof, it is to be fully understood by those skilled in the art that the invention is not limited thereto, but rather is intended to be bounded only by the limits of the appended claims.

What is claimed is:

1. An apparatus for obtaining in-situ chemical information as to the chemical properties of an atmospheric aerosol, comprising:
   a. an integrating nephelometer including a sample chamber, and inlet therefor, a light source, means for conducting light from said source to said sample chamber, a light detector positioned within said chamber, and means coupled to said light detector providing an output signal proportional to the extinction coefficient due to light scattering of an aerosol contained within said sample chamber,
   b. a humidity monitoring means providing an output signal proportional to the relative humidity within said sample chamber,
   c. means for recording the output signals from said integrating nephelometer and said humidity monitoring means,
   d. a source of moist air having a constant flow rate and temperature, and a relative humidity which is linearly variable,
   e. means for combined said moist air and an aerosol to produce an aerosol sample whose relative humidity is continuously variable from one extreme of a predetermined range to a second extreme thereof, and
f. means coupling said aerosol sample to the inlet of said integrating nephelometer.

2. An apparatus as recited in claim 1, wherein said source of air comprises a source of moist air having a relative humidity equal to 100 percent, and a variable flow rate, a source of dry air, means combining said moist air and said dry air, and means controlling said combining means to obtain a flow of air therefrom having a constant flow rate.

3. An apparatus as recited in claim 2, wherein said source of moist air comprises:

a. a constant pressure air source,
b. flow rate regulating means coupling said constant pressure air source to an output thereof,
c. means controlling said flow rate regulating means to gradually increase or decrease the flow rate at the output thereof, and
d. humidification means coupled to the output of said flow rate regulating means for adding water vapor thereto.

4. An apparatus as recited in claim 3, wherein said controlling means comprises:

a. first and second control air sources, the pressure of said second source being greater than that of said first source,
b. an air tank coupled to said flow rate regulating means,
c. a needle valve having an input and and output coupled to said air tank,
d. switching means coupling the input of said needle valve alternately to said first and second control air sources.

5. A method for determining qualitative chemical information regarding the constituent materials in an aerosol of unknown composition, comprising the steps of:

a. adding a reagent to a sample volume of said aerosol,
b. irradiating said sample volume and measuring the total light scattered by said aerosol over all scattering angles, and
c. comparing any change in total light scattering so measured with known changes in total light scattering for specific aerosols of known composition.

6. A method for qualitatively determining the presence of constituent materials within an aerosol of unknown composition, comprising the steps of:

a. varying the relative humidity of a sample volume of said aerosol,
b. irradiating said sample volume and measuring the total light scattered by said aerosol over all scattering angles, and
c. comparing any change in total light scattering so measured with known changes in total light scattering for specific aerosols of known composition.

7. A method as recited in claim 6, wherein said step of measuring the total light scattered by said aerosol includes the step of measuring the aerosol's extinction coefficient due to light scattering, and further including a step of measuring the relative humidity in said sample volume, and wherein said step of comparing further includes the step of comparing any change in said measured extinction coefficient with a change in measured relative humidity against known changes in extinction coefficients with changes in relative humidity for specific aerosols of known composition.

8. A method as recited in claim 6, further including the step of varying the relative humidity in said sample volume within a predetermined range to obtain a characteristic variation of total light scattering so measured with respect to relative humidity for said aerosol of unknown composition, and comparing said characteristic variation with known characteristic variations for specific aerosols of known composition.

9. A method as recited in claim 8, for determining the presence of deliquescent materials within said aerosol of unknown composition, further comprising the step of determining from said characteristic variation the presence of any discontinuities therein, and determining the relative humidity values at which said discontinuities occur.

10. A method as recited in claim 8, further comprising the step of continuously plotting said measured relative humidity against said measured extinction coefficient due to light scattering to obtain a characteristic curve for said aerosol.

11. A method as recited in claim 8 for determining the presence of a particular deliquescent material in said aerosol, further comprising the steps of:

a. obtaining a plurality of first characteristic variations in extinction coefficient due to light scattering with respect to relative humidity for a plurality of aerosols, each of said plurality of aerosols being composed of a single known chemical composition, b. determining the relative humidity values at which any discontinuities in the plurality of first characteristic variations thus obtained occur, c. obtaining a second characteristic variation in the extinction coefficient due to light scattering with respect to relative humidity for said aerosol, d. determining the relative humidity values at which any discontinuities in the second characteristic variation thus obtained occur, and e. comparing the relative humidity values at which discontinuities in said second characteristic variation occur with the discontinuous relative humidity values of said first plurality of characteristic variations.

12. A method for determining chemical information from an atmospheric aerosol, comprising the steps of:

a. mixing said aerosol with varying amounts of water vapor to produce an aerosol whose relative humidity is varied within a predetermined range, b. during said relative humidity variation, irradiating said aerosol and measuring the actual values of said aerosol's relative humidity and the extinction coefficient due to light scattering thereof to obtain a characteristic variation in said extinction coefficient with respect to relative humidity for said atmospheric aerosol, and c. comparing said characteristic variation in extinction coefficient due to light scattering with known characteristic variations obtained for specific atmospheric aerosols of known composition.

13. A method as recited in claim 12, for determining the presence of deliquescent materials within said atmospheric aerosol, comprising the step of determining from said characteristic variation the presence or absence of discontinuous points thereof.

14. A method as recited in claim 12, for determining the presence of hygroscopic materials within said atmospheric aerosol, comprising the step of determining from said characteristic variation the presence of any gradual increase in the extinction coefficient with a corresponding gradual increase in relative humidity thereof.

* * * * *